United States Patent
Hinkle et al.

(10) Patent No.: US 10,051,646 B2
(45) Date of Patent: Aug. 14, 2018

(54) DYNAMIC ALLOCATION OF CARRIER AGGREGATION RESOURCES BASED ON DEVICE REQUESTS

(71) Applicant: Sprint Communications Company L.P., Overland Park, KS (US)

(72) Inventors: Aaron Paul Hinkle, Centreville, VA (US); Lawrence Charles Gassman, Oakton, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 67 days.

(21) Appl. No.: 15/149,544

(22) Filed: May 9, 2016

(65) Prior Publication Data

US 2016/0309486 A1  Oct. 20, 2016

Related U.S. Application Data

(63) Continuation of application No. 14/685,941, filed on Apr. 14, 2015, now Pat. No. 9,351,309.

(51) Int. Cl.
*H04W 4/00* (2018.01)
*H04W 72/08* (2009.01)
(Continued)

(52) U.S. Cl.
CPC .......... *H04W 72/085* (2013.01); *H04J 11/00* (2013.01); *H04L 5/001* (2013.01); *H04L 5/006* (2013.01);
(Continued)

(58) Field of Classification Search
CPC . H04W 72/085; H04W 4/12; H04W 72/0453; H04W 72/087; H04W 72/08;
(Continued)

(56) References Cited

U.S. PATENT DOCUMENTS

| | | | |
|---|---|---|---|
| 8,971,388 B2 | 3/2015 | Tu et al. | |
| 2006/0078123 A1* | 4/2006 | Bichot | H04W 48/18 380/270 |
| 2007/0002897 A1* | 1/2007 | Goshen | H04L 29/06027 370/468 |
| 2012/0195283 A1 | 8/2012 | Kwon et al. | |
| 2012/0314568 A1* | 12/2012 | Tan | H04W 28/24 370/230 |
| 2013/0114415 A1 | 5/2013 | Das et al. | |
| 2013/0115914 A1 | 5/2013 | Zhou et al. | |
| 2013/0142139 A1 | 6/2013 | Kitazoe et al. | |
| 2013/0242897 A1 | 9/2013 | Meylan et al. | |

(Continued)

FOREIGN PATENT DOCUMENTS

| | | |
|---|---|---|
| CN | 102143531 | 8/2011 |
| EP | 2560436 | 2/2013 |

OTHER PUBLICATIONS

Jasmina McMenamy, et al.; "A Methodology to Help Operators Share the Spectrum through an Enhanced Form of Carrier Aggregation;" IEEE International Symposium on Dynamic Spectrum Access Networks (DYSPAN); Apr. 1, 2014; pp. 334-345.

*Primary Examiner* — Rebecca E Song

(57) ABSTRACT

Examples disclosed herein provide systems, methods, and software to dynamically provide carrier aggregation to wireless communication devices. In one example, a method of operating an eNodeB includes exchanging first wireless communication signals with a wireless communication device using a first carrier aggregation configuration. The method further provides identifying a request from the wireless communication device for a modified quality of service, and determining a second carrier aggregation configuration based on the request. The method also includes exchanging second wireless communication signals with the wireless communication device using the second carrier aggregation configuration.

12 Claims, 8 Drawing Sheets

(51) Int. Cl.
   *H04L 5/00*     (2006.01)
   *H04W 72/04*    (2009.01)
   *H04J 11/00*    (2006.01)
   *H04W 4/12*     (2009.01)
   *H04W 88/08*    (2009.01)
   *H04W 88/16*    (2009.01)

(52) U.S. Cl.
   CPC ............ *H04L 5/0064* (2013.01); *H04W 4/12* (2013.01); *H04W 72/0453* (2013.01); *H04W 72/087* (2013.01); *H04W 88/08* (2013.01); *H04W 88/16* (2013.01)

(58) Field of Classification Search
   CPC ....... H04W 88/16; H04W 72/04; H04J 11/00; H04L 5/001; H04L 5/006; H04L 5/0064
   USPC ........................................................ 370/329
   See application file for complete search history.

(56) References Cited

U.S. PATENT DOCUMENTS

| | | | |
|---|---|---|---|
| 2014/0010207 A1 | 1/2014 | Horn et al. | |
| 2014/0018026 A1 | 1/2014 | Klepser et al. | |
| 2014/0066050 A1* | 3/2014 | Kotecha | H04W 88/06 455/422.1 |
| 2014/0078898 A1* | 3/2014 | Anchan | H04W 28/0268 370/230 |
| 2014/0106709 A1 | 4/2014 | Palamara et al. | |
| 2016/0174188 A1* | 6/2016 | Kim | H04W 68/02 455/458 |

* cited by examiner

//]: #

DYNAMIC ALLOCATION OF CARRIER AGGREGATION RESOURCES BASED ON DEVICE REQUESTS

RELATED CASES

This patent application is a continuation of U.S. patent application Ser. No. 14/685,941 that was filed on Apr. 14, 2015 and is entitled "DYNAMIC ALLOCATION OF CARRIER AGGREGATION RESOURCES BASED ON DEVICE REQUESTS." U.S. patent application Ser. No. 14/685,941 is hereby incorporated by reference into this patent application.

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some communication systems, wireless access nodes may use carrier aggregation to provide communications to the various wireless communication devices. Carrier aggregation allows multiple component carriers to be aggregated to supply increased bandwidth and bitrate to the wireless devices. For example, a wireless access node may transfer data to a wireless communication device using two frequency carriers, which may be combined at the wireless communication device to create the completed data communication. However, in current communication networks, resources for carrier aggregation are allocated at the time the communication is initiated for the wireless communication device. Accordingly, if a particular communication does not require increased bandwidth and bitrate, resources may be wasted that may otherwise be provided to other communications and devices.

OVERVIEW

Examples herein provide enhancements to dynamically allocate carrier aggregation resources based on wireless communication device requests. In one implementation, a method of operating an eNodeB to dynamically provide carrier aggregation to wireless communication devices includes exchanging first wireless communication signals with a wireless communication device using a first carrier aggregation configuration. The method further provides identifying a request from the wireless communication device for a modified quality of service, and determining a second carrier aggregation configuration based on the request. The method also includes exchanging second wireless communication signals with the wireless communication device using the second carrier aggregation configuration.

DETAILED DESCRIPTION

Figure 1:
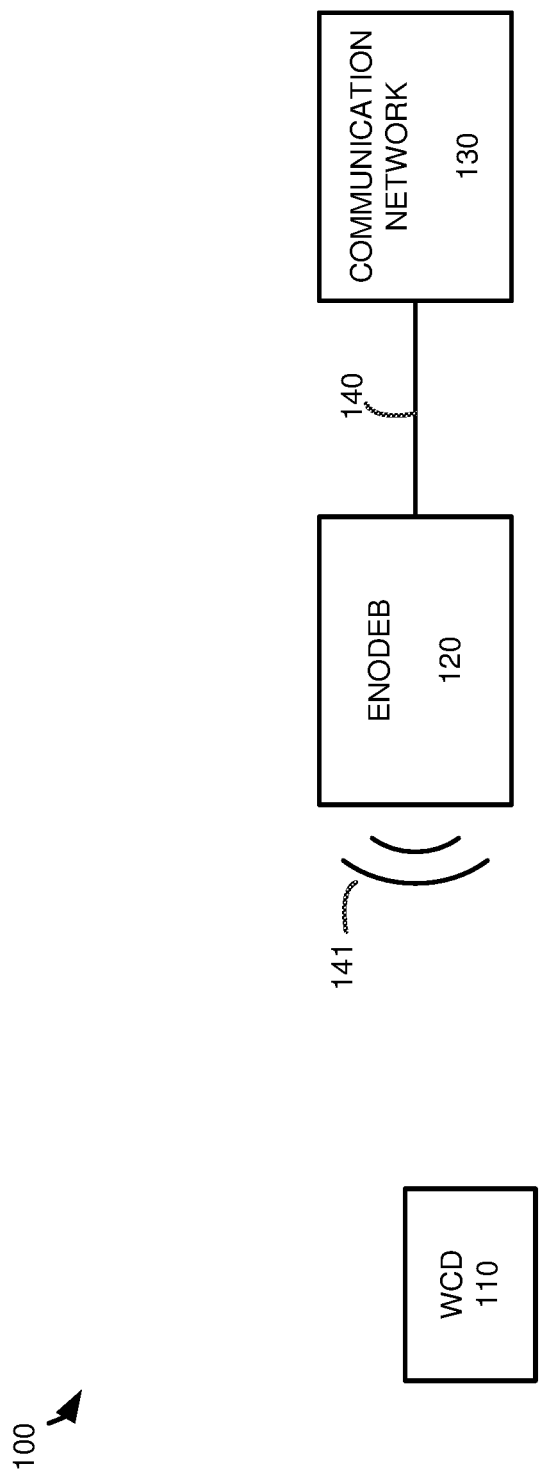
FIG. 1 illustrates a communication system to dynamically allocate carrier aggregation resources to wireless communication devices.

FIG. 1 illustrates a communication system 100 to dynamically allocate carrier aggregation resources to wireless communication devices. Communication system 100 includes wireless communication device (WCD) 110, eNodeB 120, and communication network 130. ENodeB 120 communicates with communication network 130 over communication link 140, and further provides Long Term Evolution (LTE) communication signaling to WCD 110 via wireless sector 141.

WCD 110 may comprise a smartphone, tablet, laptop computer, gaming system, or some other similar wireless device. WCD 110 may include a variety of applications including email applications, internet browser application, gaming applications, and other similar applications that, during execution on WCD 110, may require access to communication network 130. For example, an email application may require access to communication network 130 to send and receive messages for a user of WCD 110.

To provide the connection to communication network 130, eNodeB 120 is provided. ENodeB 120 acts a wireless base station that allows WCD 110 to communicate with other end user devices, servers, and other equipment within communication network 130. In particular, eNodeB 120 provides LTE communication format to WCD 110 using carrier aggregation across one or more frequency bands. Carrier aggregation allows multiple component carriers to be aggregated to supply increased bandwidth and bitrate to the wireless device. Here, eNodeB 120 may dynamically adjust the carrier aggregation configuration for WCD 110 based on a quality of service required for the wireless communication. This quality of service may be based on data requirements for the communication, such as the content required in the communication, the identity of the applications involved in the communication, the bitrate required for the data in the communication, or any other similar information.

Figure 2:
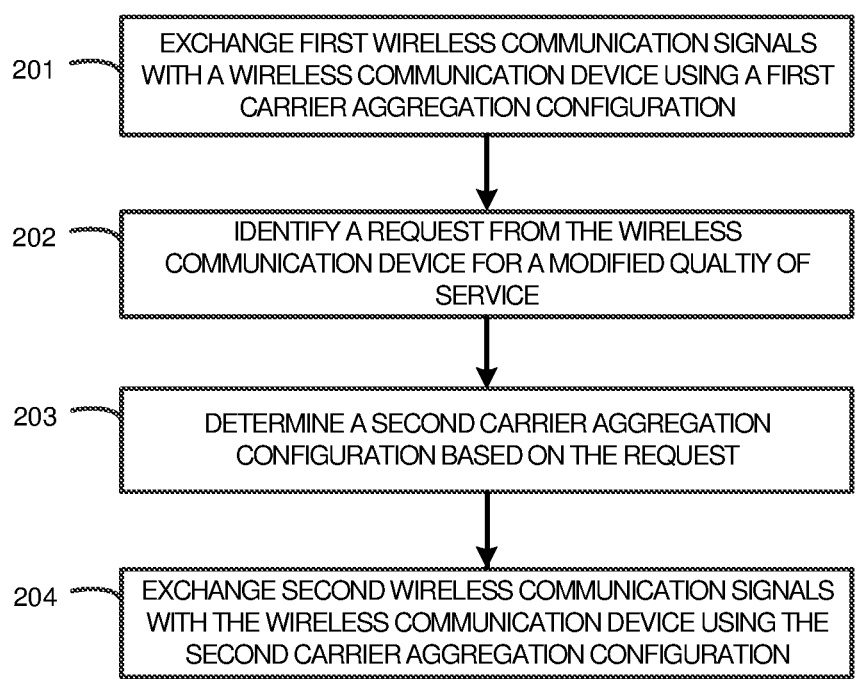
FIG. 2 illustrates a method of operating an eNodeB to dynamically provide carrier aggregation resources to a wireless communication device.

FIG. 2 illustrates a method of operating eNodeB 120 to dynamically provide carrier aggregation resources to WCD 110. As illustrated in FIG. 2, eNodeB 120 exchanges first wireless communication signals with WCD 110 using a first carrier aggregation configuration (201). This carrier aggregation configuration may include a single component carrier in some examples, or may include multiple carrier components across one or more frequency bands. During the communication, WCD 110 identifies various characteristics related to the communication to assist in determining a required quality of service. These characteristics may include bitrate requirements for the applications executing on the device, content requirements for applications executing on the device, or any other similar communication characteristics related to the applications and processes executing on WCD 110. Once the characteristics are determined for the device, WCD 110 may request a modified quality of service from eNodeB 120. This request may include a target quality of service class identifier (QCI), which is related to bitrate requirements for communications, may include a target access point name (APN), which is related to the minimum and maximum bitrates for a communication, or may include any other similar quality of service indicator for WCD 110.

Once the request is transferred, eNodeB 120 identifies the request from WCD 110 (202), and determines a second carrier aggregation configuration based on the request (203). Once the second carrier aggregation configuration is determined, eNodeB 120 exchanges second wireless communication signals with WCD 110 using the second carrier aggregation configuration (204). For example, WCD 110 may be executing a video streaming application that requires a higher bitrate for video to be properly displayed for the end user of WCD 110. When the communication is first initiated, eNodeB 120 may provide first communication signals in a first carrier aggregation format based on a default configuration for the request, such as a default QCI and APN associated with the communication request. This first carrier aggregation configuration may include a single carrier component, or may include a configuration with multiple carrier components. Once the communication is initiated, WCD 110 may determine that it requires the higher bitrate to properly display the video for the end user. Consequently, WCD 110 will request that the device receive a better quality of service using a target QCI, a target APN, or some other similar quality of service identifier. In response to the request, eNodeB 120 will identify a new carrier aggregation configuration for the device, and communicate second signals using the new carrier aggregation configuration.

In some implementations, the first carrier aggregation configuration may include a configuration to use intra-band carrier aggregation with one or more component carriers in a single band. Once a higher bitrate or quality of service is requested by WCD 110, eNodeB may provide inter-band carrier aggregation allowing multiple carrier components across multiple frequency bands. In other implementations, the first signals provided to WCD 110 may comprise inter-band carrier aggregation, anticipating a particular bitrate communication for the device. Once WCD 110 requests a lower bitrate or quality of service, eNodeB 120 and WCD 110 may transition to using intra-band carrier aggregation with one or more carrier components in a single band.

Figure 3:
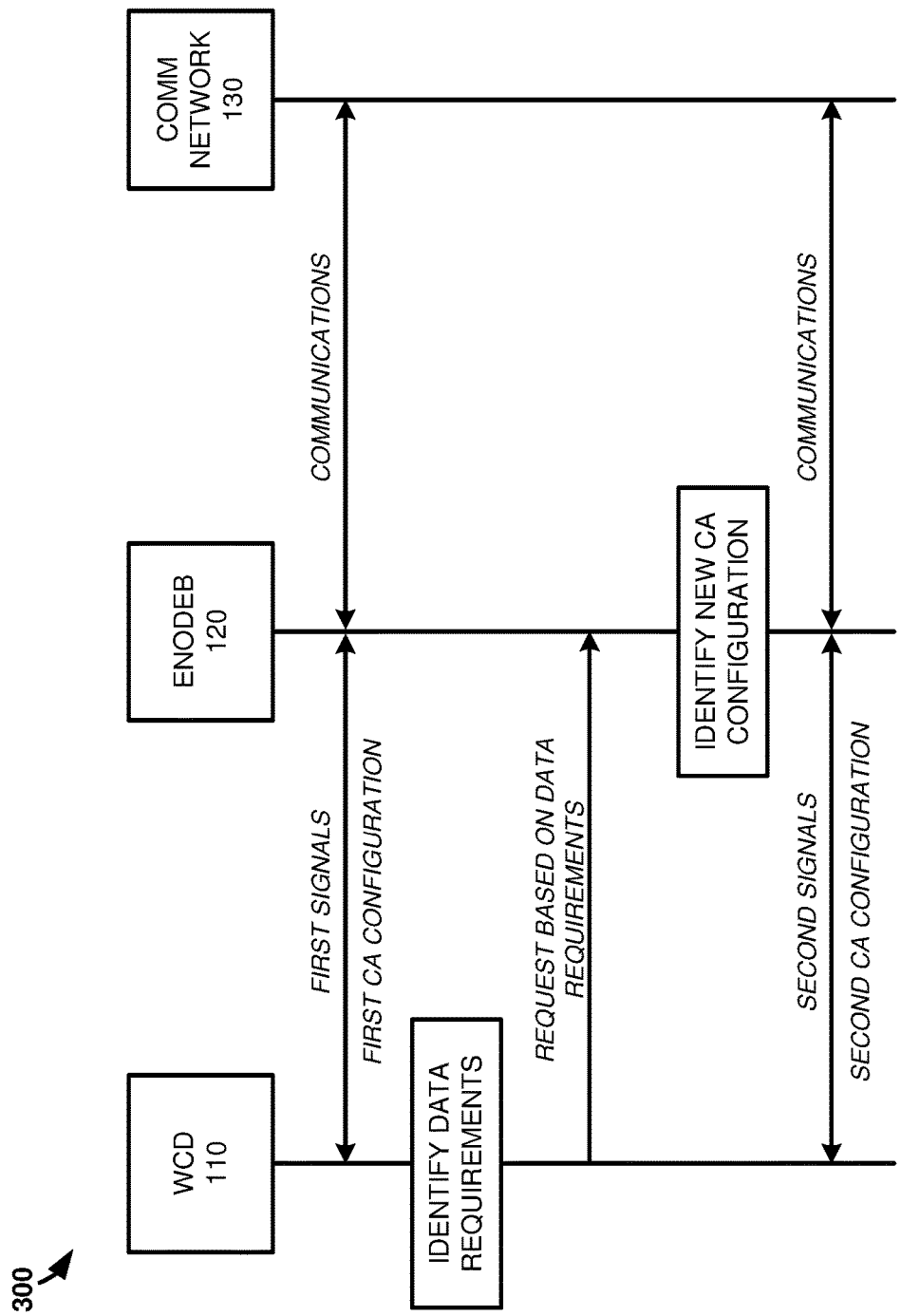
FIG. 3 illustrates a timing diagram to dynamically provide carrier aggregation resources to a wireless communication device.

FIG. 3 illustrates a timing diagram 300 to dynamically provide carrier aggregation resources to wireless communication devices. Timing diagram 300 demonstrates a sample operation of communication system 100 from FIG. 1. As depicted in FIG. 3, WCD 110 may require a communication with one or more devices and systems in communication network 130. This initial communication may be configured based on a QCI associated with the communication request, the APN associated with the communication request, or any other information associated with the communication request, including combinations thereof. For example, if WCD 110 were executing a video streaming application, WCD 110 may be provided with a QCI of eight or nine, which corresponds to a packet delay of three-hundred milliseconds and a non-guaranteed bitrate as a resource type. Based on the initial configuration for WCD 110, eNodeB 120 may communicate with WCD 110 using first signals and a first carrier aggregation format. This first carrier aggregation format may include a single carrier component, or may include multiple carrier components.

Once the communication is initiated, WCD 110 identifies data requirements specific to the applications that required the communication. These data requirements may include content requirements, bitrate requirements, or some other requirements specific to the communication for WCD 110. For example, an application that is streaming a high-definition movie may require a higher bitrate than is currently being provided, whereas a messaging application may require a lower bitrate than is currently being provided. Based on the data requirement identified for WCD 110, WCD 110 transfers a request to modify the quality of service that is being provided to the device. This request may be delivered in the form of a target QCI for the device, a target APN for the device, or some other quality of service identifier for the requesting device.

In response to receiving the request, eNodeB 120 translates the request into a modified carrier aggregation configuration for the communication. For example, initially, the communication provided to WCD 110 may be configured with a QCI of nine, however, based on the data requirements of WCD 110, the WCD may request a new QCI of four or some other higher priority QCI. Based on the request, eNodeB 120 may identify a carrier aggregation configuration that can provide WCD 110 with a higher bitrate to accommodate the request. Once identified, eNodeB 120 may transition to the modified carrier aggregation configuration and exchange second signals with WCD 110 using the modified carrier aggregation configuration.

As an illustrative example, WCD 110 may initiate a group messaging application with one or more other end user devices in communication network 130. This initiated communication may include a first carrier aggregation configuration with a first QCI and APN determined by policy functions within the wireless network. Once the communication is initiated, WCD 110 identifies data requirements for the group message application, including the bitrate or content that is required for the application. Based on the data requirements, WCD 110 may request eNodeB to modify the carrier aggregation configuration for the device. Accordingly, if the data requirements for the application included a requirement for a higher bitrate, the request may correspond to more carrier components for the device. In contrast, if the data requirements for the application provided that a smaller bitrate could provide the same functionality, the request may correspond to a smaller amount of carrier components for the device. Once the request is received, and eNodeB 120 identifies a new carrier aggregation configuration for WCD 110, and second signals may be exchanged with WCD 110 using the new carrier aggregation.

Figure 4:
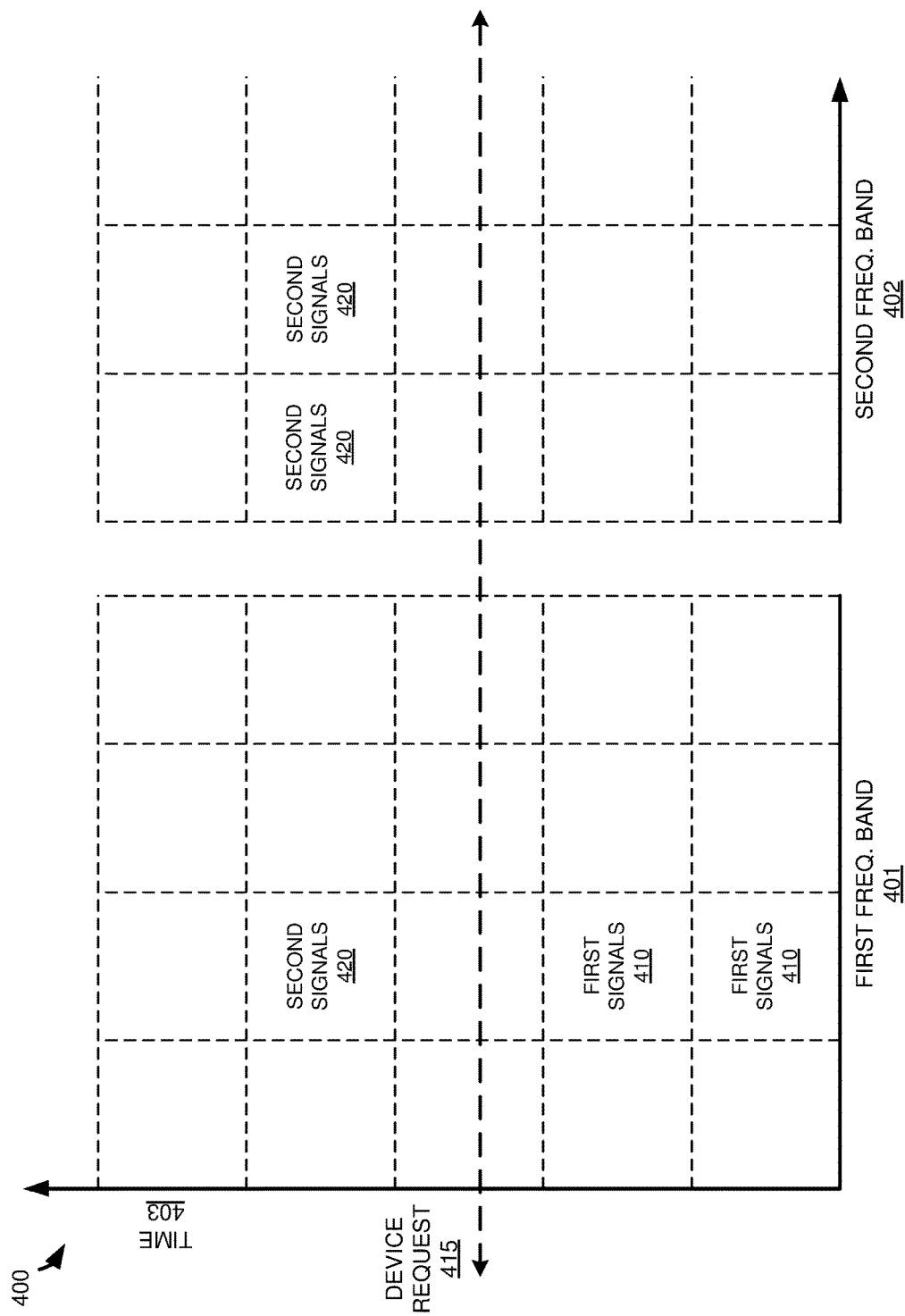
FIG. 4 illustrates a carrier aggregation diagram for a wireless communication device according to one implementation.

FIG. 4 illustrates a carrier aggregation diagram 400 for a wireless communication device according to one implementation. Carrier aggregation diagram 400 includes a time axis 403, first frequency band 401, and second frequency band 402. Although two frequency bands are illustrated in the present example, it should be understood that similar operations might be applied to any number of frequency bands.

As illustrated in FIG. 4, a WCD initiates a communication and exchanges first signals 410 with an eNodeB in first frequency band 401. During the communication, the WCD may identify data requirements for applications executing on the device. Based on the data requirements, which may be determined based on the identity of the applications, the content required by the applications, the bitrate requested by the applications, or any other data requirement measurement, a device request 415 may be transferred by the WCD to the eNodeB for a change in the quality of service. This request may include a target QCI for the communication, a target APN for the communication, or any other similar quality of service related target.

Here, the WCD requests a better quality of service based on the data requirements for the one or more applications executing on the device. For example, the device may be executing a streaming application that requires a higher bitrate to adequately display the video for the end user of the device. In response to the request, the eNodeB may modify the carrier aggregation configuration for the device to provide the increase in bitrate. As illustrated in FIG. 4, this modified carrier aggregation exchanges second signals 420 in first frequency band 401 and second frequency band 402. These second signals add carrier components to the communication with the WCD, allowing increased bandwidth and bitrate to the device. Accordingly, based on data requirements for the applications communicating on the WCD, the eNodeB may dynamically allocate carrier aggregation resources to the device.

Although illustrated in the present example as adding two carrier components for the communication, it should be understood that other numbers of carrier components might be added for carrier aggregation. Further, although depicted as a transition from a single carrier component to inter-band carrier aggregation, it should be understood that in some implementations one or more carriers may be added in first frequency band 401 to generate a new intra-band carrier aggregation configuration.

Figure 5:
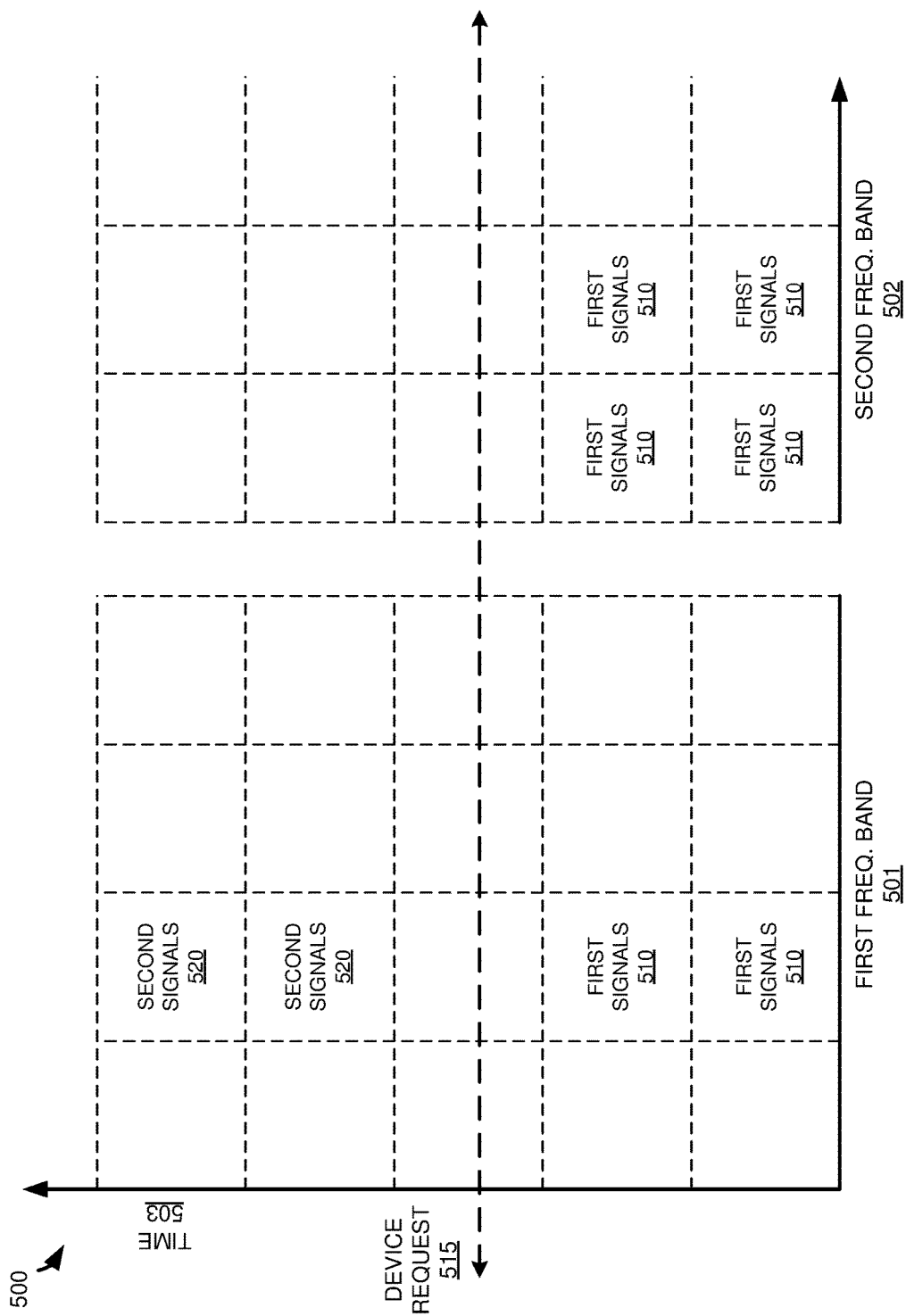
FIG. 5 illustrates a carrier aggregation diagram for a wireless communication device according to one implementation.

FIG. 5 illustrates a carrier aggregation diagram 500 for a wireless communication device according to one implementation. Carrier aggregation diagram 500 includes a time axis 503, first frequency band 501, and second frequency band 502. Although two frequency bands are illustrated in the present example, it should be understood that similar operations might be applied to any number of frequency bands.

As depicted in FIG. 5, a WCD initiates a communication and exchanges first signals 510 with an eNodeB in first frequency band 501 and second frequency band 502. First signals 510 are representative of carrier aggregation, wherein multiple frequency carrier components are used to provide a larger bitrate and bandwidth to the end user device. In particular, first signals 510 provide inter-band carrier aggregation to the WCD.

During the communication, the WCD monitors the data requirements for the various applications communicating over the network, and transfers a device request 515 for modifications to the carrier aggregation configuration for the device based on these requirements. In some implementations, the request may comprise a target QCI, a target APN, or some other quality of service related request. In response to receiving device request 515, the eNodeB may translate the request into the appropriate carrier aggregation configuration. Referring to the example of carrier aggregation diagram 500, the eNodeB may reduce the number of carrier components allocated to the WCD to provide the requested quality of service. Once the number of carrier components is reduced, the eNodeB may communicate second signals 520 using the reduced number of carrier components. For example, if the WCD were executing an instant messaging application, the application may not require the same amount of resources as a video streaming application. As a result, the device may request a lower quality of service or bitrate in relation to the data requirements for the application.

Although illustrated in the present example as removing two carrier components for the modified carrier aggregation configuration, it should be understood that a single carrier component might be removed in some examples.

Figure 6:
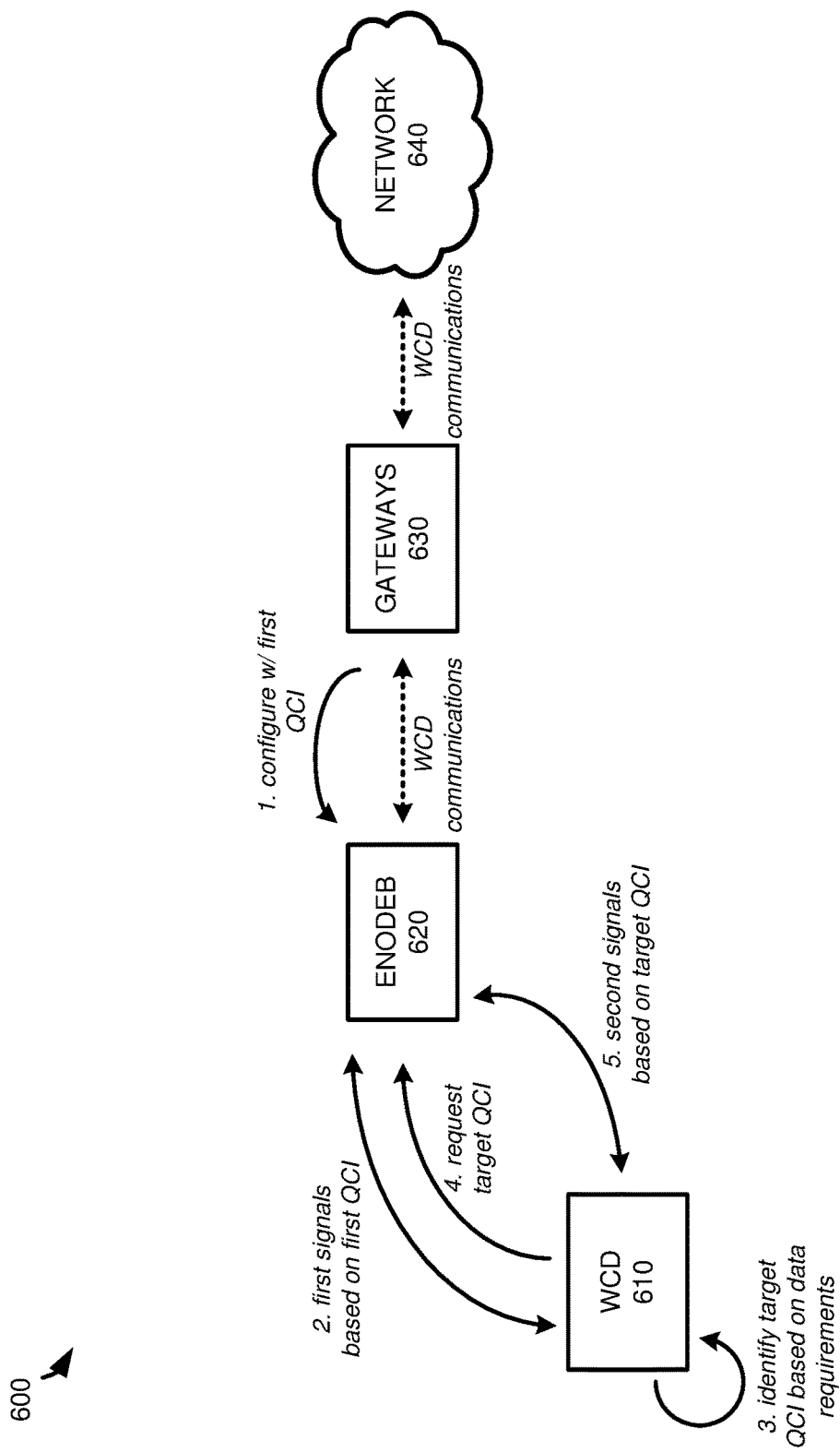
FIG. 6 illustrates an operational scenario of dynamically providing carrier aggregation resources to a wireless communication device according to one implementation.

FIG. 6 illustrates an operational scenario 600 of dynamically providing carrier aggregation resources to wireless communication devices according to one implementation. Operational scenario 600 includes WCD 610, eNodeB 620, gateways 630, and network 640. Gateways 630 are representative of serving gateways (SGWs), packet data network gateways (PGWs), or some other gateway or management function of the wireless network. Gateways 630 provide access to network 640 for eNodeB 620, which in turn provides LTE communication format to WCD 610.

In operation, a communication may be initiated for WCD 610. To accommodate the communication, a QCI is determined for the communication by gateways 630 based on the communication request. For example, a video call may have a QCI of two, which is higher priority than a request for an email application that may have a QCI of eight or nine. Once the QCI is determined for the communication, the QCI is used to configure bearers and the first carrier aggregation configuration for the communication with WCD 610. Once the bearers and carrier aggregation configuration are determined based on at least the QCI, eNodeB 620 communicates first signals with WCD 610 using the first carrier aggregation format.

During the communication, WCD 610 monitors data requirements for the applications on the device. These data requirements may be based on a preferred bitrate for an application, the identity of the application itself, or the type of content that the application is accessing. For example, a video streaming application may require a higher bitrate to provide a higher quality of service to the end user. Based on the data requirements of the executing applications, WCD 610 may identify a target QCI to be provided to eNodeB 620 as a request to modify the current carrier aggregation configuration. Once the request is transferred and received by eNodeB 620, eNodeB 620 may translate the target QCI into a modified carrier aggregation configuration to provide a greater or lesser bitrate as required by the WCD.

In some implementations, the first carrier aggregation configuration for WCD 610 may comprise an intra-band carrier aggregation configuration with one or more component carriers, and the second carrier aggregation configuration for the WCD may comprise an inter-band carrier aggregation configuration with at least two component carriers. By expanding to an inter-band carrier aggregation configuration, eNodeB 620 may provide greater bandwidth and bitrate to WCD 610.

Figure 7:
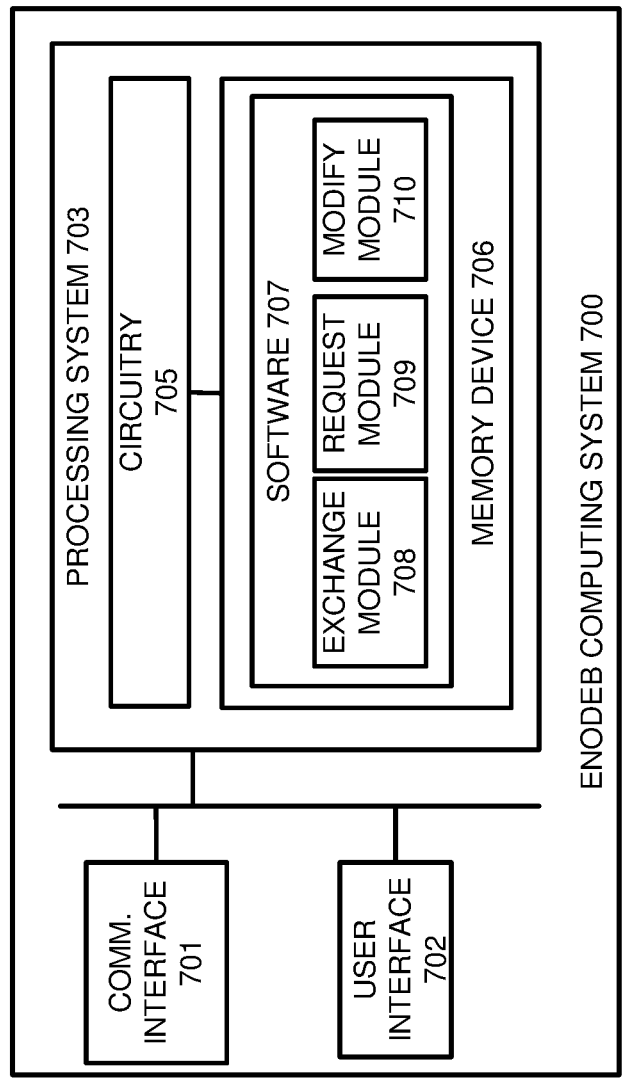
FIG. 7 illustrates an eNodeB computing system to dynamically provide carrier aggregation resources to wireless communication devices.

FIG. 7 illustrates an eNodeB computing system 700 to dynamically provide carrier aggregation resources to wireless communication devices. ENodeB computing system 700 is representative of any computing system or systems with which the various operational architectures, processes, scenarios, and sequences disclosed herein for an eNodeB may be implemented. ENodeB computing system 700 is an example of eNodeB 120 and eNodeB 620, although other examples may exist. ENodeB computing system 700 comprises communication interface 701, user interface 702, and processing system 703. Processing system 703 is linked to communication interface 701 and user interface 702. Processing system 703 includes processing circuitry 705 and memory device 706 that stores operating software 707.

ENodeB computing system 700 may include other well-known components such as a battery and enclosure that are not shown for clarity. Computing system 700 may be a personal computer, server, or some other computing apparatus—including combinations thereof.

Communication interface 701 comprises components that communicate over communication links, such as network cards, ports, radio frequency (RF) transceivers, processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols such as LTE, communication signaling, or some other communication format—including combinations thereof. In some implementations, communication interface 701 may be configured to communicate with gateways and other access nodes of the wireless network that connect to the Internet and other packet data networks. Communication interface 701 further communicates wirelessly with WCDs that require access to the wireless network.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes exchange module 708, request module 709, and modify module 710, although any number of software modules may provide the same operation. Operating software 707 may further include an operating system, utilities, drivers, network interfaces, applications, or some other type of software. When executed by processing circuitry 705, operating software 707 directs processing system 703 to operate eNodeB computing system 700 as described herein.

In particular, exchange module 708 directs processing system 703 to exchange first wireless communication signals with a WCD using a first carrier aggregation configuration. This carrier aggregation configuration may include a single carrier component, or may include multiple carrier components that together provide the necessary communications for the device. During the communication, the WCD may identify data requirements for the device, and generate a request for a modified quality of service. For example, the WCD may identify that the currently executing applications require a greater bitrate than is currently being provided. Accordingly, the WCD may transfer a request to computing system 700 indicating such a change is desired. In some implementations, the request may include a target QCI or APN for the communication based on the data requirements, but it should be understood that the quality of service request might include any other similar information.

Request module 709 directs processing system 703 to receive the request from the WCD, and modify module 710 directs processing system 703 to modify the current carrier aggregation configuration based on the request. Once modified, exchange module 708 may exchange second wireless communication signals with the WCD using the modified carrier aggregation configuration. For example, computing system 700 may identify that a higher bitrate is requested by the WCD. Responsive to the request, one or more carrier components may be added to provide the communication to the WCD.

Figure 8:
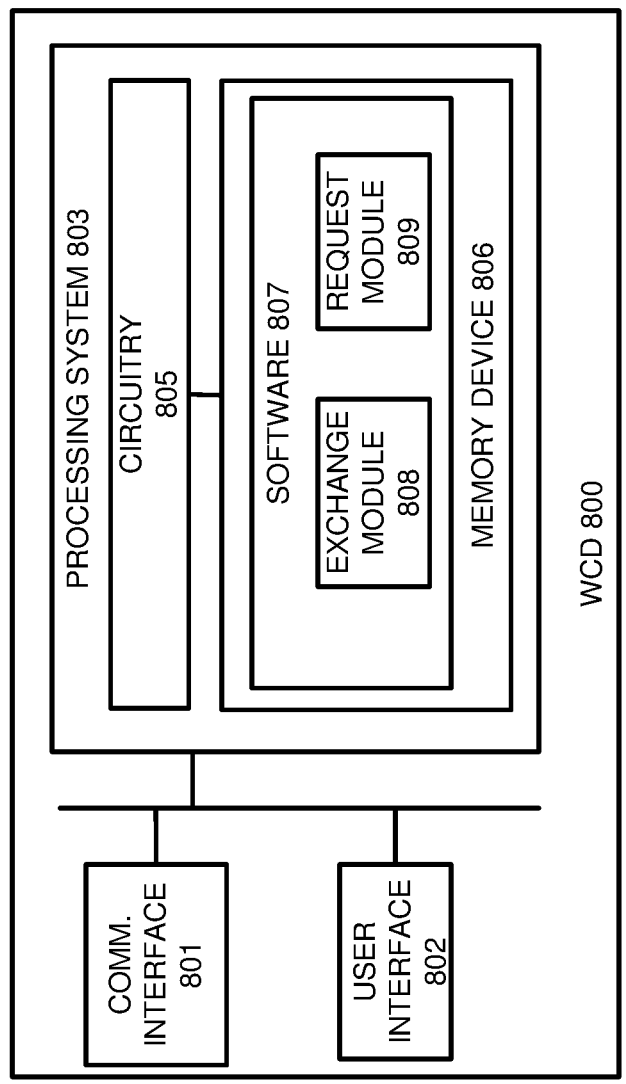
FIG. 8 illustrates a wireless communication device to dynamically request carrier aggregation resources.

FIG. 8 illustrates a WCD 800 to dynamically request carrier aggregation resources. WCD 800 is representative of any computing system or systems with which the various operational architectures, processes, scenarios, and sequences disclosed herein for a WCD may be implemented. WCD 800 is an example of WCD 110 and WCD 610, although other examples may exist. WCD 800 comprises communication interface 801, user interface 802, and processing system 803. Processing system 803 is linked to communication interface 801 and user interface 802. Processing system 803 includes processing circuitry 805 and memory device 806 that stores operating software 807. WCD 800 may include other well-known components such as a battery and enclosure that are not shown for clarity. WCD 800 may be a smartphone, tablet, laptop computer, gaming system or some other similar computing device.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols such as LTE, communication signaling, or some other communication format—including combinations thereof. Communication interface 801 may communicate with eNodeBs over LTE, wherein eNodeB provides access to networks such as the internet or other packet data networks.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 includes exchange module 808 and request module 809, although any number of software modules may provide the same operation. Operating software 807 may further include an operating system, utilities, drivers, network interfaces, applications, or some other type of software. When executed by processing circuitry 805, operating software 807 directs processing system 803 to WCD 800 as described herein.

In particular, applications executed by processing system 803 may require access to a wireless network to provide particular operations. For example, a video streaming application may require access to a server to download the required content for a video. To provide the data, exchange module 808 directs processing system 803 to exchange first wireless communication signals with an eNodeB using a first carrier aggregation configuration. This configuration may include a single carrier component in some examples, or may provide multiple components in other implementations.

During the communication, request module 809 directs processing system 803 to identify data requirements for the various applications executing on the device. These data requirements may include bitrate requirements for the applications, information about the content required by the applications, the type or name of the application, or any other similar data requirement information. Based on the data requirements, request module 809 when executed by processing system 803 generates and transfers a request via communication interface 801 to the eNodeB providing the communication signaling. This request may include a target QCI request that corresponds to a target bitrate for the data requirements, a target APN request that corresponds to a target bit rate for the data requirements, or any other similar quality of service request based on the communication requirements for the device.

Once transferred to the eNodeB, the eNodeB may modify the current carrier aggregation configuration, and initiate the exchange of secondary wireless communication signals with WCD 800 using a secondary carrier aggregation configuration. This secondary carrier aggregation configuration may increase the bitrate to the device, when the device requires an increased bit rate, or may decrease the bitrate for the device when the device requires a lower bitrate.

Returning to the elements of FIG. 1, WCD 110 comprises Radio Frequency (RF) communication circuitry and an antenna. The RF communication circuitry typically includes an amplifier, filter, modulator, and signal processing circuitry. WCD 110 may also include a user interface, memory device, software, processing circuitry, or some other communication components. WCD 110 may be a telephone, computer, e-book, mobile Internet appliance, wireless network interface card, media player, game console, or some other wireless communication apparatus.

ENodeB 103 comprises RF communication circuitry and at least one antenna to provide Long Term Evolution (LTE) wireless communications. The RF communication circuitry typically includes an amplifier, filter, RF modulator, and signal processing circuitry. ENodeB 103 may also comprise a router, server, memory device, software, processing circuitry, cabling, power supply, network communication interface, structural support, or some other communication apparatus.

Communication network 130 comprises network elements that provide communication services to WCD 110. Communication network 130 may comprise switches, wireless access nodes, Internet routers, network gateways, application servers, computer systems, communication links, or some other type of communication equipment—including combinations thereof. Communication network 130 may comprise the internet, an LTE wireless communication network, as well as other similar communication networks.

Wireless sector 141 includes wireless links that use the air or space as transport media, and communicate with WCD 110 using LTE format. Communication link 140 could use various communication protocols, such as Time Division Multiplex (TDM), Internet Protocol (IP), Ethernet, communication signaling, wireless communication signaling, or some other communication format—including combinations thereof. Communication link 140 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless base station to use Long Term Evolution (LTE) Carrier Aggregation (CA) to support a video application, the method comprising:
   exchanging wireless communication signals with a wireless communication device using the LTE CA over a frequency band to deliver a Quality-of-Service (QoS);
   receiving a request from the wireless communication device identifying the video application, a QoS Class Identifier (QCI) for the video application, and an Access Point Name (APN) for the video application, and in response, identifying a larger frequency band based on the QCI and the APN for the video application to deliver an increased QoS to the video application; and
   exchanging additional wireless communication signals with the wireless communication device using the LTE CA over the larger frequency band to deliver the increased QoS to the video application.

2. The method of claim 1 wherein the request indicates a content requirement for the video application.

3. The method of claim 1 wherein:
   the request indicates a content requirement for the video application; and
   identifying the larger frequency band to deliver the increased QoS comprises identifying the larger frequency band based on the content requirement.

4. The method of claim 1 wherein the request indicates a bit-rate for the video application.

5. The method of claim 1 wherein:
   the request indicates a bit-rate for the video application; and
   identifying the larger frequency band to deliver the increased QoS comprises identifying the larger frequency band based on the bit-rate.

6. The method of claim 1 wherein the wireless base station comprises an LTE eNodeB.

7. A wireless base station to use Long Term Evolution (LTE) Carrier Aggregation (CA) to support a video application, the wireless base station comprising:
   a communication interface comprising a Radio Frequency (RF) transceiver configured to exchange wireless communication signals with a wireless communication device using the LTE CA over a frequency band to deliver a Quality-of-Service (QoS);
   a computer system comprising processing circuitry and memory configured to process a request from the wireless communication device identifying the video application, a QoS Class Identifier (QCI) for the video application, and an Access Point Name (APN) for the video application, and in response, identify a larger frequency band based on the QCI and the APN for the video application to deliver an increased QoS to the video application; and the communication interface comprising the RF transceiver is further configured to exchange additional wireless communication signals with the wireless communication device using the LTE CA over the larger frequency band to deliver the increased QoS to the video application.

8. The wireless base station of claim 7 wherein the request indicates a content requirement for the video application.

9. The wireless base station of claim 7 wherein:
the request indicates a content requirement for the video application; and
the computer system is configured to identify the larger frequency band to deliver the increased QoS based on the content requirement.

10. The wireless base station of claim 7 wherein the request indicates a bit-rate for the video application.

11. The wireless base station of claim 7 wherein:
the request indicates a bit-rate for the video application; and
the computer system is configured to identify the larger frequency band to deliver the increased QoS based on the bit-rate.

12. The wireless base station of claim 7 wherein the wireless base station comprises an LTE eNodeB.

* * * * *